(12) United States Patent
Yasin et al.

(10) Patent No.: US 12,423,075 B2
(45) Date of Patent: Sep. 23, 2025

(54) CODE PREFETCH INSTRUCTION

(71) Applicant: Intel Corporation, Santa Clara, CA (US)

(72) Inventors: Ahmad Yasin, Haifa (IL); Lihu Rappoport, Haifa (IL); Jared W. Stark, Portland, OR (US); Jeffrey Baxter, Cupertino, CA (US); Israel Diamand, Aderet (IL); Pavel Fridman, Haifa (IL); Ibrahim Hur, Portland, OR (US); Nir Tell, Atlit (IL)

(73) Assignee: Intel Corporation, Santa Clara, CA (US)

( * ) Notice: Subject to any disclaimer, the term of this patent is extended or adjusted under 35 U.S.C. 154(b) by 710 days.

(21) Appl. No.: 17/033,751

(22) Filed: Sep. 26, 2020

(65) Prior Publication Data

US 2021/0342134 A1   Nov. 4, 2021

Related U.S. Application Data

(60) Provisional application No. 63/017,585, filed on Apr. 29, 2020.

(51) Int. Cl.
    *G06F 9/44*    (2018.01)
    *G06F 8/41*    (2018.01)
(52) U.S. Cl.
    CPC .................. *G06F 8/4442* (2013.01)
(58) Field of Classification Search
    CPC .................................................. G06F 8/4442
    See application file for complete search history.

(56) References Cited

U.S. PATENT DOCUMENTS

| | | | | |
|---|---|---|---|---|
| 2003/0005419 | A1* | 1/2003 | Pieper | G06F 8/4442 717/141 |
| 2005/0027921 | A1* | 2/2005 | Hirotsu | G06F 9/3802 712/E9.055 |
| 2009/0138661 | A1 | 5/2009 | Lauterbach | |
| 2014/0019721 | A1* | 1/2014 | Stavrou | G06F 9/30047 712/207 |
| 2015/0378731 | A1* | 12/2015 | Lai | G06F 9/46 712/30 |
| 2016/0378667 | A1* | 12/2016 | Roberts | G06F 12/0862 711/119 |

(Continued)

FOREIGN PATENT DOCUMENTS

EP   1353267 A2   10/2003

OTHER PUBLICATIONS

Extended European Search Report and Search Opinion, EP App. No. 20212602.5, Jun. 15, 2021, 10 pages.
Office Action, EP App. No. 20212602.5, Feb. 21, 2024, 06 pages.

*Primary Examiner* — Qamrun Nahar
(74) *Attorney, Agent, or Firm* — Nicholson De Vos Webster & Elliott LLP

(57) ABSTRACT

Embodiments of apparatuses, methods, and systems for code prefetching are described. In an embodiment, an apparatus includes an instruction decoder, load circuitry, and execution circuitry. The instruction decoder is to decode a code prefetch instruction. The code prefetch instruction is to specify a first instruction to be prefetched. The load circuitry is to prefetch the first instruction in response to the decoded code prefetch instruction. The execution circuitry is to execute the first instruction at a fetch stage of a pipeline.

17 Claims, 8 Drawing Sheets

METHOD 800 executing a code prefetch instruction to fetch program code to an instruction cache and/or an instruction TLB
810 executing the prefetched code at a fetch stage of a pipeline instead of an execute stage
820

(56) References Cited

U.S. PATENT DOCUMENTS

2017/0161070 A1  6/2017 Busaba et al.
2017/0371666 A1* 12/2017 Gschwind ........... G06F 9/30047
2022/0236993 A1*  7/2022 Smith .................. G06F 9/3806

* cited by examiner

Instruction Format 700

| Opcode<br>PREFETCHC<br>710 | Displacement/Immediate/<br>Operand to specify address<br>720 |

FIG. 7

CODE PREFETCH INSTRUCTION

FIELD OF INVENTION

The field of invention relates generally to computer architecture, and, more specifically, to prefetching.

BACKGROUND

In typical computer and information processing systems, data needed to execute an instruction may be stored in a memory. The latency of fetching the data from the memory may add to the time required to execute the instruction, thereby decreasing performance. To improve performance, techniques for fetching data before it may be needed have been developed. Such prefetching techniques involve moving the data closer to the processor in the memory hierarchy, for example, moving data from main system memory to a cache, so that if it is needed to execute an instruction, it will take less time to fetch.

BRIEF DESCRIPTION OF THE DRAWINGS

The present invention is illustrated by way of example and not limitation in the figures of the accompanying drawings, in which like references indicate similar elements and in which:

FIG. 7 illustrates a format of a code prefetch instruction according to embodiments.

DETAILED DESCRIPTION

Figure 1A:
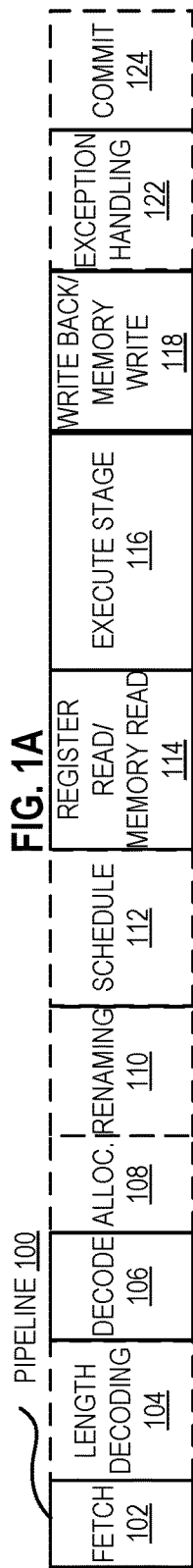
FIG. 1A is a block diagram illustrating both an exemplary in-order pipeline and an exemplary register renaming, out-of-order issue/execution pipeline according to embodiments of the invention.

In the following description, numerous specific details are set forth. However, it is understood that embodiments of the invention may be practiced without these specific details. In other instances, well-known circuits, structures, and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

As used in this description and the claims and unless otherwise specified, the use of the ordinal adjectives "first," "second," "third," etc. to describe an element merely indicate that a particular instance of an element or different instances of like elements are being referred to, and is not intended to imply that the elements so described must be in a particular sequence, either temporally, spatially, in ranking, or in any other manner.

Also, the terms "bit," "flag," "field," "entry," "indicator," etc., may be used to describe any type or content of a storage location in a register, table, database, or other data structure, whether implemented in hardware or software, but are not meant to limit embodiments of the invention to any particular type of storage location or number of bits or other elements within any particular storage location. The term "clear" may be used to indicate storing or otherwise causing the logical value of zero to be stored in a storage location, and the term "set" may be used to indicate storing or otherwise causing the logical value of one, all ones, or some other specified value to be stored in a storage location; however, these terms are not meant to limit embodiments of the present invention to any particular logical convention, as any logical convention may be used within embodiments of the present invention.

Also, as used in descriptions of embodiments of the invention, a "/" character between terms may mean that an embodiment may include or be implemented using, with, and/or according to the first term and/or the second term (and/or any other additional terms).

As discussed in the background section, prefetching of data may improve the performance of computer systems. Prefetching of code (instructions) may provide a similar benefit. An instruction set architecture (ISA) of a processor may include one or more instructions for prefetching of data. Such an instruction may be used for prefetching of code. Embodiments of the invention include a code prefetch instruction in an ISA, which may be desired to overcome potential drawbacks of fetching code with data prefetching instructions, such as pollution of data caches and creation of self-modifying code scenarios.

Embodiments of the invention may include a code prefetch instruction to prefetch code to an instruction cache and/or instruction translation lookaside buffer. The prefetched code may be executed at a fetch stage of a pipeline instead of an execute stage. Accordingly, processors and systems such as those illustrated in FIGS. 1 through 6 may include embodiments of the invention.

Processor cores according to embodiments of the invention may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Figure 1B:
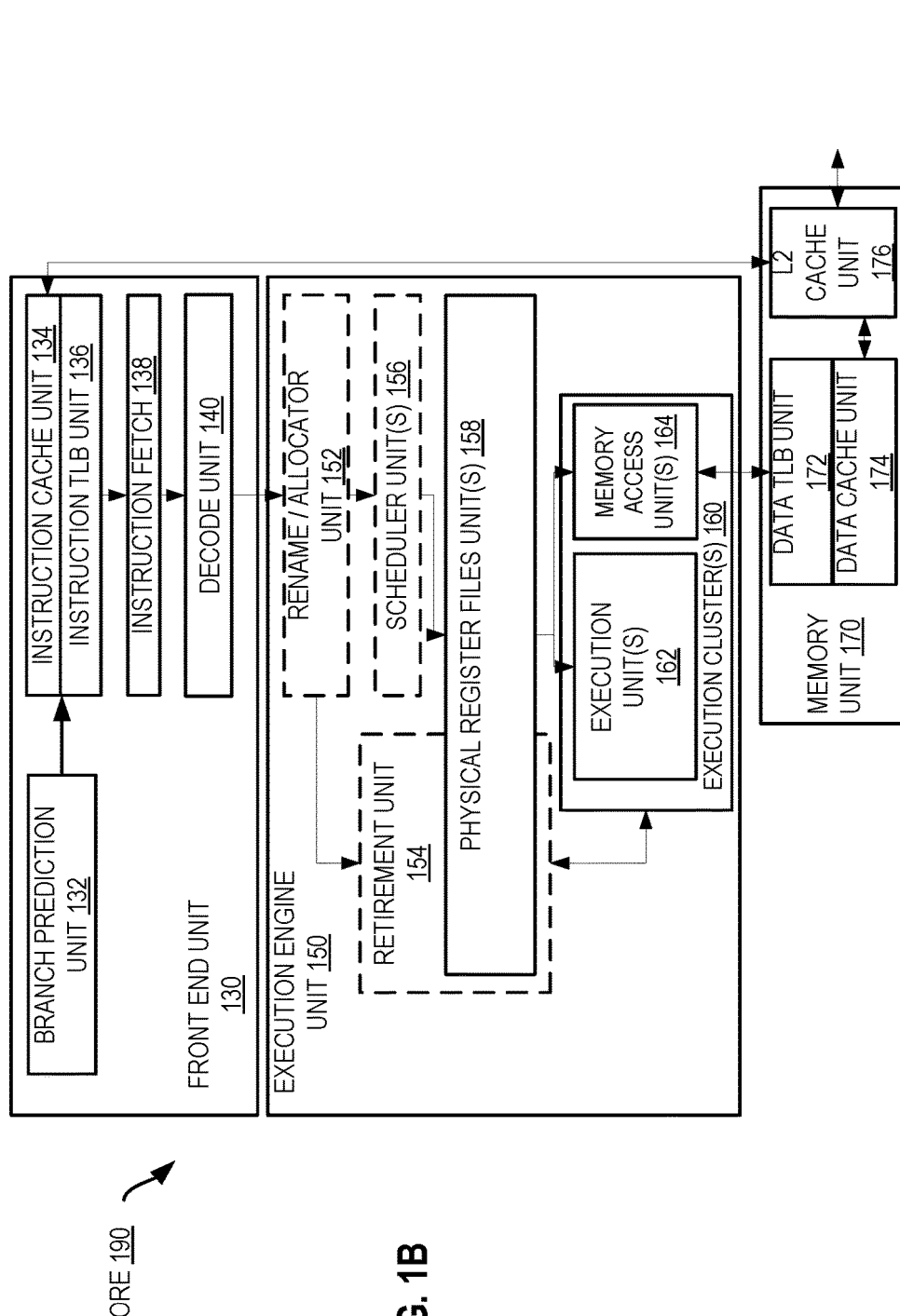
FIG. 1B is a block diagram illustrating both an exemplary embodiment of an in-order architecture core and an exemplary register renaming, out-of-order issue/execution architecture core to be included in a processor according to embodiments of the invention.

FIG. 1A is a block diagram illustrating both an exemplary in-order pipeline and an exemplary register renaming, out-of-order issue/execution pipeline according to embodiments of the invention. FIG. 1B is a block diagram illustrating both an exemplary embodiment of an in-order architecture core and an exemplary register renaming, out-of-order issue/execution architecture core to be included in a processor according to embodiments of the invention. The solid lined boxes in FIGS. 1A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 1A, a processor pipeline 100 includes a fetch stage 102, a length decode stage 104, a decode stage 106, an allocation stage 108, a renaming stage 110, a scheduling (also known as a dispatch or issue) stage 112, a register read/memory read stage 114, an execute stage 116, a write back/memory write stage 118, an exception handling stage 122, and a commit stage 124.

FIG. 1B shows processor core 190 including a front-end unit 130 coupled to an execution engine unit 150, and both are coupled to a memory unit 170. The core 190 may be a reduced instruction set computing (RISC) core, a complex instruction set computing (CISC) core, a very long instruction word (VLIW) core, or a hybrid or alternative core type. As yet another option, the core 190 may be a special-purpose core, such as, for example, a network or communication core, compression engine, coprocessor core, general purpose computing graphics processing unit (GPGPU) core, graphics core, or the like.

The front-end unit 130 includes a branch prediction unit 132, which represents a branch prediction unit or branch predictor according to an embodiment of the present invention.

Branch prediction unit 132 is coupled to an instruction cache unit 134, which is coupled to an instruction translation lookaside buffer (TLB) 136, which is coupled to an instruction fetch unit 138, which is coupled to a decode unit 140. The decode unit 140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 190 includes a microcode ROM or other medium that stores microcode for certain macroinstructions (e.g., in decode unit 140 or otherwise within the front-end unit 130). The decode unit 140 is coupled to a rename/allocator unit 152 in the execution engine unit 150.

The execution engine unit 150 includes the rename/allocator unit 152 coupled to a retirement unit 154 and a set of one or more scheduler unit(s) 156. The scheduler unit(s) 156 represents any number of different schedulers, including reservations stations, central instruction window, etc. The scheduler unit(s) 156 is coupled to the physical register file(s) unit(s) 158. Each of the physical register file(s) units 158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 158 comprises a vector registers unit, a write mask registers unit, and a scalar registers unit. These register units may provide architectural vector registers, vector mask registers, and general-purpose registers. The physical register file(s) unit(s) 158 is overlapped by the retirement unit 154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 154 and the physical register file(s) unit(s) 158 are coupled to the execution cluster(s) 160. The execution cluster(s) 160 includes a set of one or more execution units 162 and a set of one or more memory access units 164. The execution units 162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 156, physical register file(s) unit(s) 158, and execution cluster(s) 160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 164). It should also be understood that where separate pipelines are used, one or more of these pipelines may be out-of-order issue/execution and the rest in-order.

The set of memory access units 164 is coupled to the memory unit 170, which includes a data TLB unit 172 coupled to a data cache unit 174 coupled to a level 2 (L2) cache unit 176. In one exemplary embodiment, the memory access units 164 may include a load unit, a store address unit, and a store data unit, each of which is coupled to the data TLB unit 172 in the memory unit 170. The instruction cache unit 134 is further coupled to a level 2 (L2) cache unit 176 in the memory unit 170. The L2 cache unit 176 is coupled to one or more other levels of cache and eventually to a main memory.

By way of example, the exemplary register renaming, out-of-order issue/execution core architecture may implement the pipeline 100 as follows: 1) the instruction fetch 138 performs the fetch and length decoding stages 102 and 104; 2) the decode unit 140 performs the decode stage 106; 3) the rename/allocator unit 152 performs the allocation stage 108 and renaming stage 110; 4) the scheduler unit(s) 156 performs the schedule stage 112; 5) the physical register file(s) unit(s) 158 and the memory unit 170 perform the register read/memory read stage 114; the execution cluster 160 perform the execute stage 116; 6) the memory unit 170 and the physical register file(s) unit(s) 158 perform the write back/memory write stage 118; 7) various units may be involved in the exception handling stage 122; and 8) the retirement unit 154 and the physical register file(s) unit(s) 158 perform the commit stage 124.

The core 190 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 190 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 134/174 and a shared L2 cache unit 176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 2:
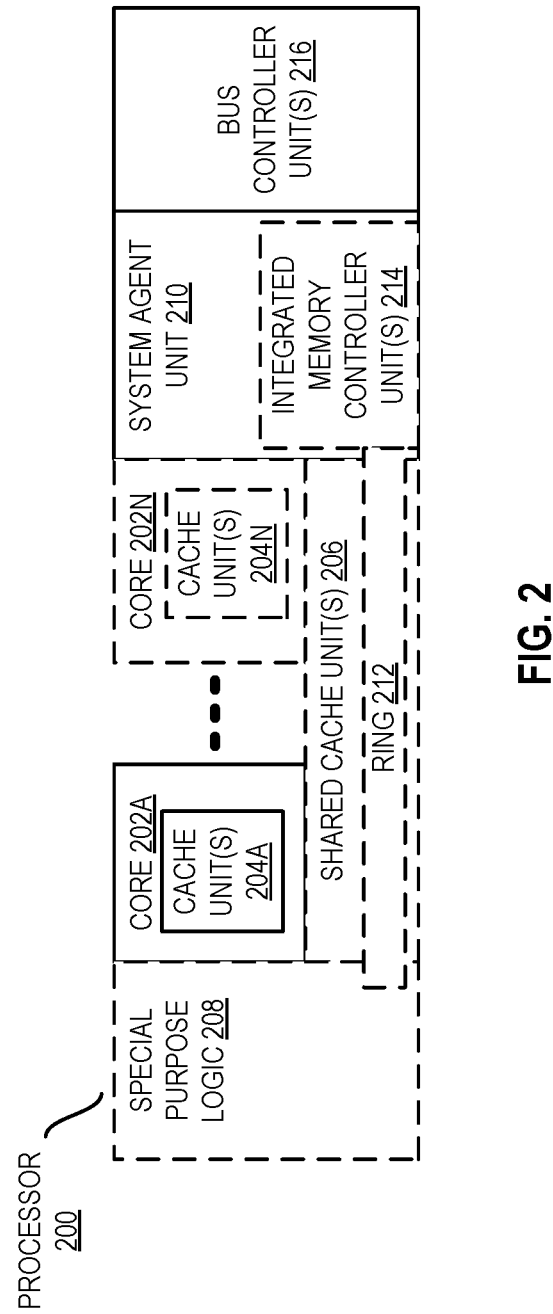
FIG. 2 is a block diagram of a processor that may have more than one core, may have an integrated memory controller, and may have integrated graphics according to embodiments of the invention.

FIG. 2 is a block diagram of a processor 200 that may have more than one core, may have an integrated memory controller, and may have integrated graphics according to embodiments of the invention. The solid lined boxes in FIG. 2 illustrate a processor 200 with a single core 202A, a system agent 210, a set of one or more bus controller units 216, while the optional addition of the dashed lined boxes illustrates an alternative processor 200 with multiple cores 202A-N, a set of one or more integrated memory controller unit(s) 214 in the system agent unit 210, and special purpose logic 208.

Thus, different implementations of the processor 200 may include: 1) a CPU with the special purpose logic 208 being integrated graphics and/or scientific (throughput) logic (which may include one or more cores), and the cores 202A-N being one or more general purpose cores (e.g., general purpose in-order cores, general purpose out-of-order cores, a combination of the two); 2) a coprocessor with the cores 202A-N being a large number of special purpose cores intended primarily for graphics and/or scientific (throughput); and 3) a coprocessor with the cores 202A-N being a large number of general purpose in-order cores. Thus, the processor 200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 206, and external memory (not shown) coupled to the set of integrated memory controller units 214. The set of shared cache units 206 may include one or more mid-level caches, such as level 2 (L2), level 3 (L3), level 4 (L4), or other levels of cache, a last level cache (LLC), and/or combinations thereof. While in one embodiment a ring based interconnect unit 212 interconnects the integrated graphics logic 208 (integrated graphics logic 208 is an example of and is also referred to herein as special purpose logic), the set of shared cache units 206, and the system agent unit 210/integrated memory controller unit(s) 214, alternative embodiments may use any number of well-known techniques for interconnecting such units. In one embodiment, coherency is maintained between one or more cache units 206 and cores 202-A-N.

In some embodiments, one or more of the cores 202A-N are capable of multithreading. The system agent 210 includes those components coordinating and operating cores 202A-N. The system agent unit 210 may include for example a power control unit (PCU) and a display unit. The PCU may be or include logic and components needed for regulating the power state of the cores 202A-N and the integrated graphics logic 208. The display unit is for driving one or more externally connected displays.

The cores 202A-N may be homogenous or heterogeneous in terms of architecture instruction set; that is, two or more of the cores 202A-N may be capable of execution the same instruction set, while others may be capable of executing only a subset of that instruction set or a different instruction set.

FIGS. 3-6 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 3:
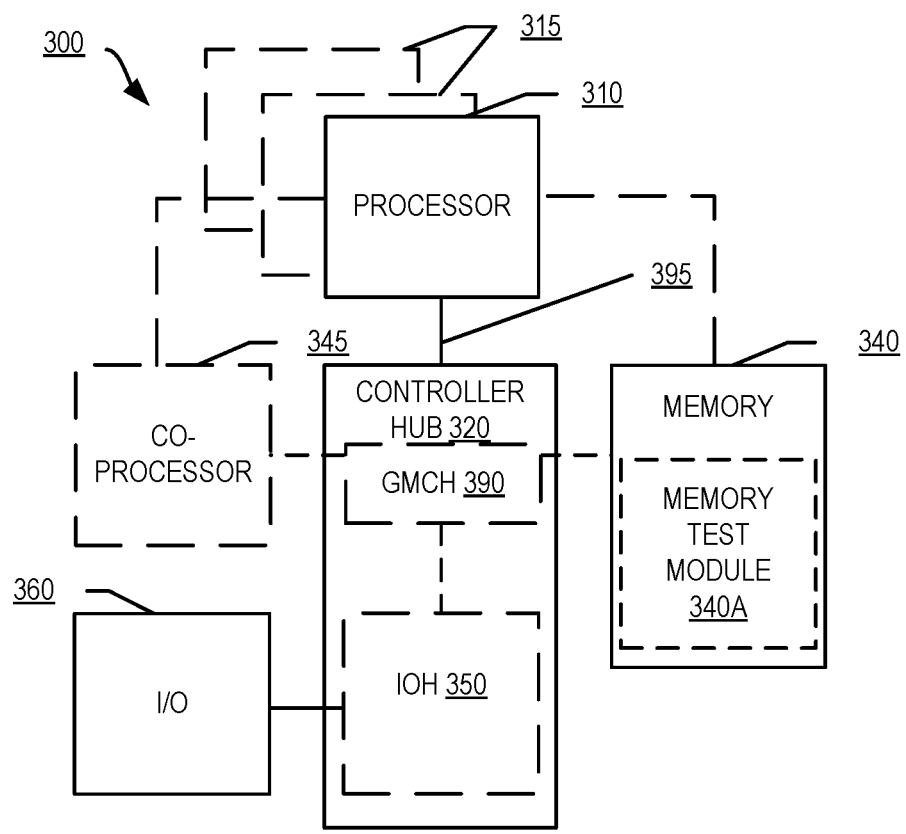
FIG. 3 is a block diagram of a system in accordance with one embodiment of the present invention.

Referring now to FIG. 3, shown is a block diagram of a system 300 in accordance with one embodiment of the present invention. The system 300 may include one or more processors 310, 315, which are coupled to a controller hub 320. In one embodiment, the controller hub 320 includes a graphics memory controller hub (GMCH) 390 and an Input/Output Hub (IOH) 350 (which may be on separate chips); the GMCH 390 includes memory and graphics controllers to which are coupled memory 340 and a coprocessor 345; the IOH 350 couples input/output (I/O) devices 360 to the GMCH 390. Alternatively, one or both of the memory and graphics controllers are integrated within the processor (as described herein), the memory 340 and the coprocessor 345 are coupled directly to the processor 310, and the controller hub 320 in a single chip with the IOH 350.

The optional nature of additional processors 315 is denoted in FIG. 3 with broken lines. Each processor 310, 315 may include one or more of the processing cores described herein and may be some version of the processor 200.

The memory 340 may be, for example, dynamic random-access memory (DRAM), phase change memory (PCM), or a combination of the two. For at least one embodiment, the controller hub 320 communicates with the processor(s) 310, 315 via a multi-drop bus, such as a frontside bus (FSB), point-to-point interface such as QuickPath Interconnect (QPI), or similar connection 395.

In one embodiment, the coprocessor 345 is a special-purpose processor, such as, for example, a high-throughput MIC processor, a network or communication processor, compression engine, graphics processor, GPGPU, embedded processor, or the like. In one embodiment, controller hub 320 may include an integrated graphics accelerator.

There can be a variety of differences between the physical resources 310, 315 in terms of a spectrum of metrics of merit including architectural, microarchitectural, thermal, power consumption characteristics, and the like.

In one embodiment, the processor 310 executes instructions that control data processing operations of a general type. Embedded within the instructions may be coprocessor instructions. The processor 310 recognizes these coprocessor instructions as being of a type that should be executed by the attached coprocessor 345. Accordingly, the processor 310 issues these coprocessor instructions (or control signals representing coprocessor instructions) on a coprocessor bus or other interconnect, to coprocessor 345. Coprocessor(s) 345 accept and execute the received coprocessor instructions.

Figure 4:
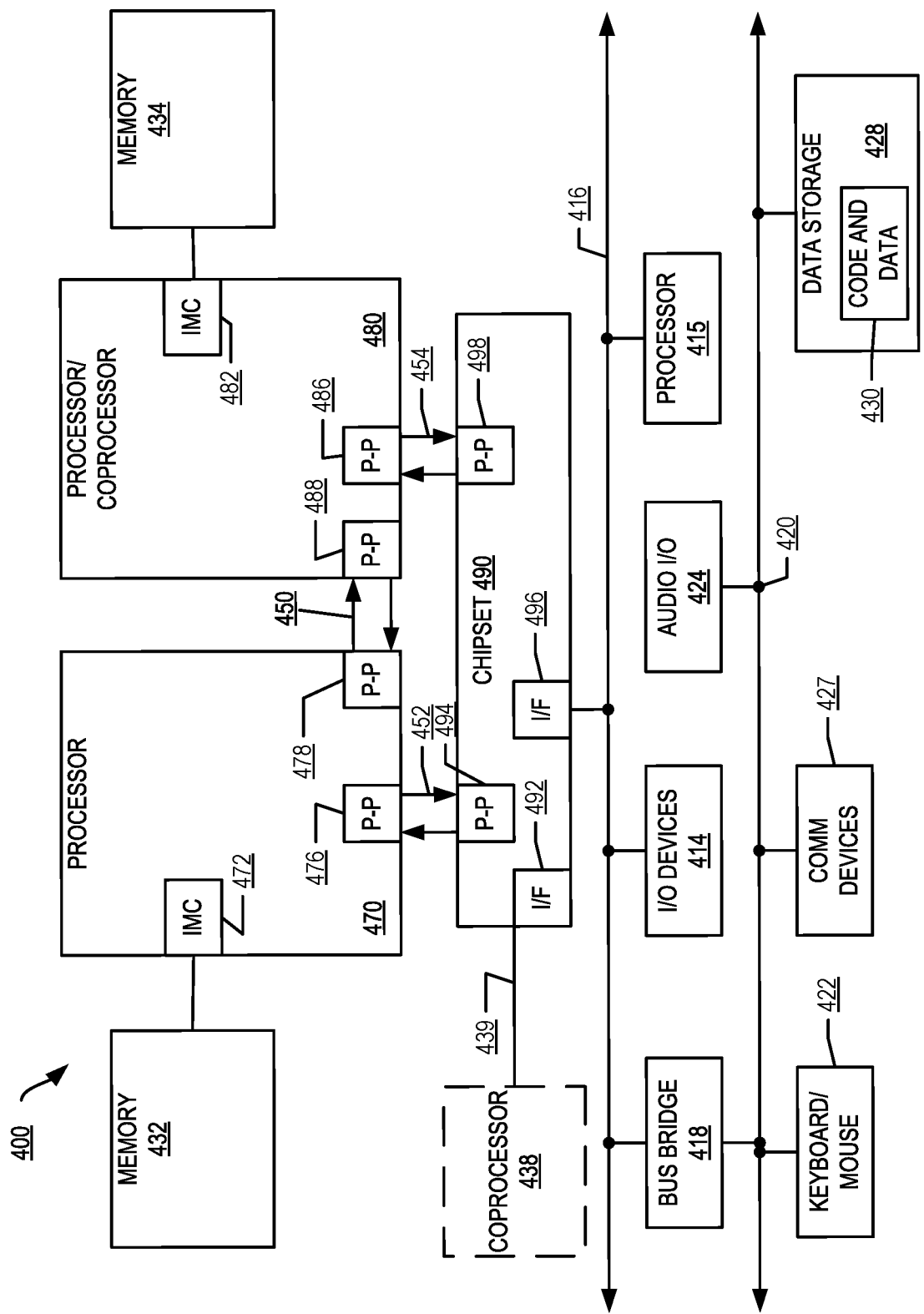
FIG. 4 is a block diagram of a first more specific exemplary system in accordance with an embodiment of the present invention.

Referring now to FIG. 4, shown is a block diagram of a first more specific exemplary system 400 in accordance with an embodiment of the present invention. As shown in FIG. 4, multiprocessor system 400 is a point-to-point interconnect system, and includes a first processor 470 and a second processor 480 coupled via a point-to-point interconnect 450. Each of processors 470 and 480 may be some version of the processor 200. In one embodiment of the invention, processors 470 and 480 are respectively processors 310 and 315, while coprocessor 438 is coprocessor 345. In another embodiment, processors 470 and 480 are respectively processor 310 coprocessor 345.

Processors 470 and 480 are shown including integrated memory controller (IMC) units 472 and 482, respectively. Processor 470 also includes as part of its bus controller unit's point-to-point (P-P) interfaces 476 and 478; similarly, second processor 480 includes P-P interfaces 486 and 488. Processors 470, 480 may exchange information via a point-to-point (P-P) interface 450 using P-P interface circuits 478, 488. As shown in FIG. 4, IMCs 472 and 482 couple the processors to respective memories, namely a memory 432 and a memory 434, which may be portions of main memory locally attached to the respective processors.

Processors 470, 480 may each exchange information with a chipset 490 via individual P-P interfaces 452, 454 using point to point interface circuits 476, 494, 486, 498. Chipset 490 may optionally exchange information with the coprocessor 438 via a high-performance interface 492. In one embodiment, the coprocessor 438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 490 may be coupled to a first bus 416 via an interface 496. In one embodiment, first bus 416 may be a Peripheral Component Interconnect (PCI) bus, or a bus such as a PCI Express bus or another third generation I/O interconnect bus, although the scope of the present invention is not so limited.

As shown in FIG. 4, various I/O devices 414 may be coupled to first bus 416, along with a bus bridge 418 which couples first bus 416 to a second bus 420. In one embodiment, one or more additional processor(s) 415, such as coprocessors, high-throughput MIC processors, GPGPU's, accelerators (such as, e.g., graphics accelerators or digital signal processing (DSP) units), field programmable gate arrays, or any other processor, are coupled to first bus 416. In one embodiment, second bus 420 may be a low pin count (LPC) bus. Various devices may be coupled to a second bus 420 including, for example, a keyboard and/or mouse 422, communication devices 427 and a storage unit 428 such as a disk drive or other mass storage device which may include instructions/code and data 430, in one embodiment. Further, an audio I/O 424 may be coupled to the second bus 420. Note that other architectures are possible. For example, instead of the point-to-point architecture of FIG. 4, a system may implement a multi-drop bus or other such architecture.

Figure 5:
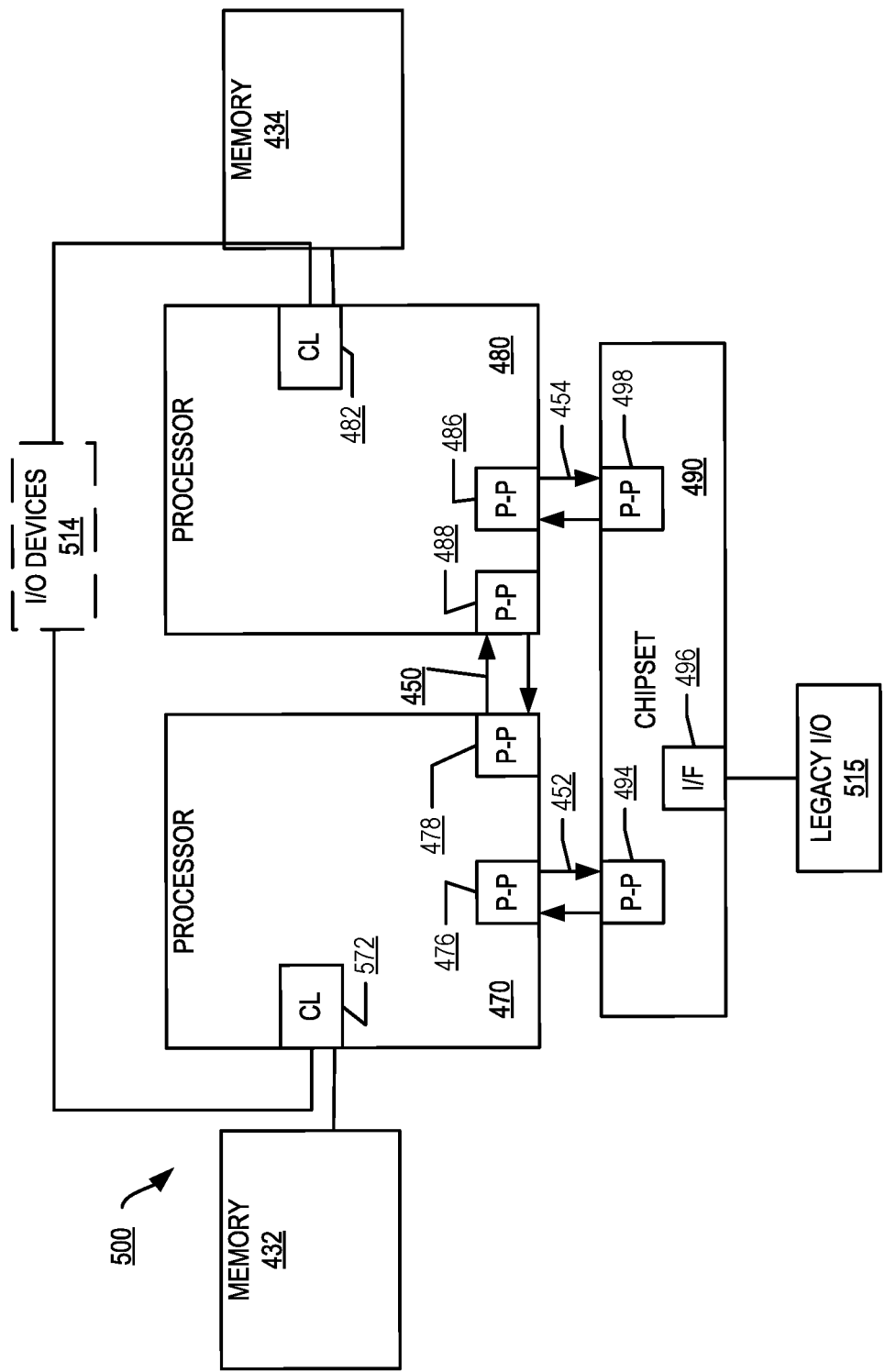
FIG. 5 is a block diagram of a second more specific exemplary system in accordance with an embodiment of the present invention.

Referring now to FIG. 5, shown is a block diagram of a second more specific exemplary system 500 in accordance with an embodiment of the present invention. Like elements in FIGS. 4 and 5 bear like reference numerals, and certain aspects of FIG. 4 have been omitted from FIG. 5 in order to avoid obscuring other aspects of FIG. 5.

FIG. 5 illustrates that the processors 470, 480 may include integrated memory and I/O control logic ("CL") 472 and 482, respectively. Thus, the CL 472, 482 include integrated memory controller units and include I/O control logic. FIG. 5 illustrates that not only are the memories 432, 434 coupled to the CL 472, 482, but also that I/O devices 514 are also coupled to the control logic 472, 482. Legacy I/O devices 515 are coupled to the chipset 490.

Figure 6:
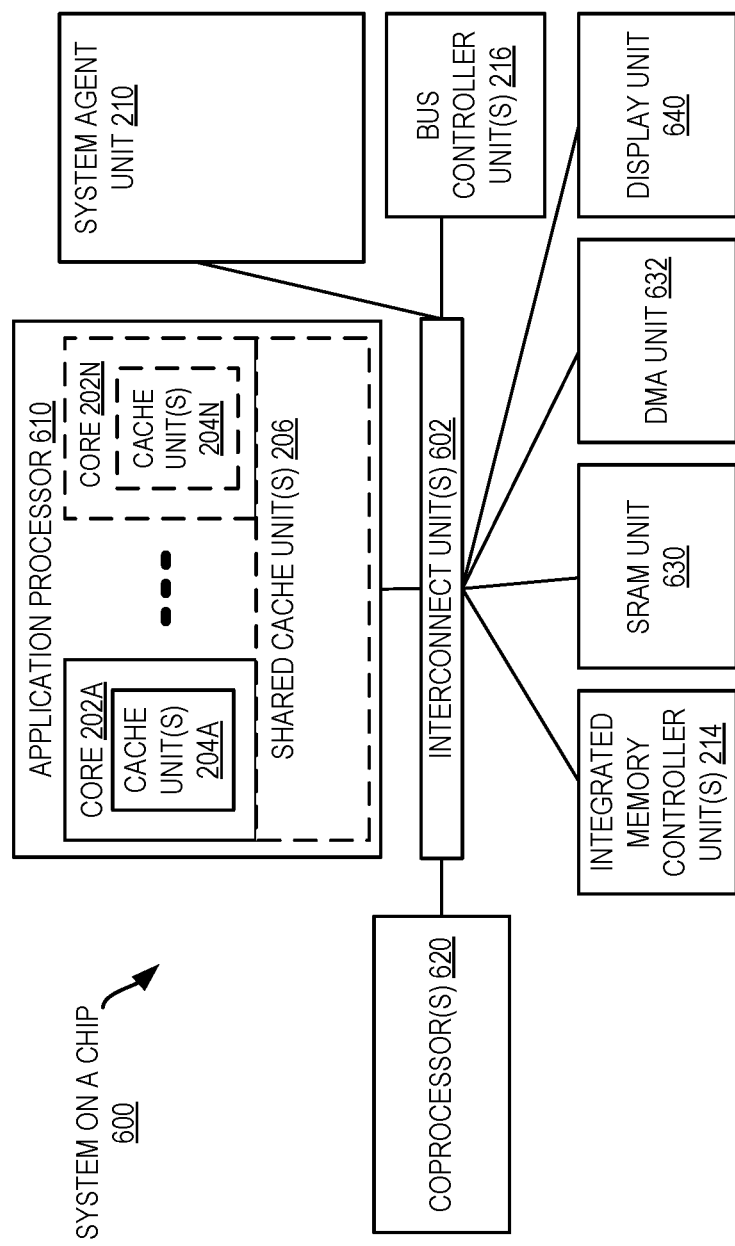
FIG. 6 is a block diagram of a SoC in accordance with an embodiment of the present invention.

Referring now to FIG. 6, shown is a block diagram of a SoC 600 in accordance with an embodiment of the present invention. Similar elements in FIG. 2 bear like reference numerals. Also, dashed lined boxes are optional features on more advanced SoCs. In FIG. 6, an interconnect unit(s) 602 is coupled to: an application processor 610 which includes a set of one or more cores 202A-N, which include cache units 204A-N, and shared cache unit(s) 206; a system agent unit 210; a bus controller unit(s) 216; an integrated memory controller unit(s) 214; a set or one or more coprocessors 620 which may include integrated graphics logic, an image processor, an audio processor, and a video processor; an static random access memory (SRAM) unit 630; a direct memory access (DMA) unit 632; and a display unit 640 for coupling to one or more external displays. In one embodiment, the coprocessor(s) 620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 430 illustrated in FIG. 4, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high-level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores, may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Embodiments of the invention include a code prefetch instruction, which may be an instruction that specifies program code (e.g., or one or more instructions) is to be and/or to be prefetched. In embodiments, a code prefetch instruction may be, may provide, and/or may include a hint to the processor hardware related to temporality of the code to be prefetched (e.g., that it is to be prefetched, to where it is to be prefetched), as further described below. In embodiments, processor hardware may be implemented to (sometimes or always) ignore these hints.

In embodiments, code prefetch instruction may have an instruction format 700 as shown in FIG. 7. Format 700 may include field 710 for an opcode (e.g., represented by a mnemonic such as PREFETCHC, PREFETCHC0 (where '0' indicates a temporality hint as described below), etc.) and field 720 for an operand, displacement, immediate, etc. Content of field 720 may specify (directly or indirectly, e.g., through a register or memory location, through a calculation such as adding an offset or displacement to a base address) an address (e.g., a starting address) from which the code is to be prefetched. In embodiments, the address may be or be translatable to an absolute address, a relative address (e.g., relative to an instruction pointer in an instruction pointer register (RIP)), etc.

Embodiments may include various manners of operation of a processor and/or core (e.g., core 190 in FIG. 1B, core(s) 202A-N in FIG. 2, processor 200 in FIG. 2, processor(s) 310-315 in FIG. 3, processor(s) 470-480 in FIGS. 4/5, core(s) 202A-N in FIG. 6, processor 610 in FIG. 6) in response to a code prefetch instruction. Any of these manners of operations may be by default or may be selected (e.g., based on configuration/programming of the core/processor/system and/or specified by additional parameters associated with the instruction). Any additional parameters may be specified by different/additional variants of the instruction (e.g., different opcode or additional opcode field), leaves of the instruction, prefixes, suffixes, operands, immediates, etc. Embodiments may include any combination of the details described below.

In embodiments, the code may be fetched to one or more locations in a hierarchy of structures that may store instructions to be executed (e.g., an instruction cache (e.g., i-cache 134 in FIG. 1B), an instruction TLB (e.g., iTLB 136 in FIG. 1B), a unified mid-level cache (e.g., L2 cache 176 in FIG. 1B) by a core/processor. In embodiments, the choice of location(s) may be related to temporality or expected temporality of the code, where the location(s) and/or temporality may be specified by a parameter of the instruction.

In embodiments, one or more spans (e.g., how many cache lines to prefetch) of code may be prefetched with a single invocation/execution of a code prefetch instruction. In embodiments, span(s) may be specified by a parameter of the instruction.

In embodiments, code prefetching may be conditional. For example, it may be performed or not performed based on context, which, in embodiments, may be provided by a hash of a preceding block of instructions).

Embodiments may provide a feature to allow the prefetched code to be executed when fetched (execute-at-fetch), for example at pipeline stage 102 in FIG. 1 instead of pipeline stage 116. In embodiments, an execute-at-fetch feature may be enabled by including an encoded fetch-address in the code prefetch instruction (e.g., encoding as an immediate/displacement and/or relative to a RIP, instead of passing the fetch-address through a register).

In some embodiments, a code prefetch instruction may be executed by fetch logic/circuitry (e.g., IFU 138 in FIG. 1), and in other embodiments, bypasses stages 104-114 in FIG. 1, but is still executed using execution units 162.

In embodiments, an execute-at-fetch feature may be implemented with and/or otherwise involve micro-architectural support. In embodiments, an instruction length decoder may calculate the prefetch address, possibly leveraging conditional jump logic, and send it to an instruction fetch unit (e.g., IFU 138 in FIG. 1), skipping an instruction queue write. In embodiments, an IFU may perform opportunistic lookups that do not return instruction-bytes to a micro-instruction translation engine. In embodiment, the prefetch may be performed without inserting an in-use-flush for the iTLB/i-cache (e.g., but with issuing an in-use clear). In embodiments, the iTLB lookup may be performed without setting an in-use bit on a hit and/or an instruction-fetch clear (IFClear) and/or a branch-prediction-next-instruction-pointer stall (stall-BPNIP) on a miss. In embodiments, an iTLB entry may hold a pending fill until retirement of an in-use-clear micro-operation. In embodiments, an i-cache lookup, using an address translated by the iTLB, and allocation to an instruction stream buffer may be performed. In embodiments, a page miss handler may drop the request in response to a page fault.

Embodiments may include other architectural semantics and/or implementation details. In embodiments, the instruction may fetch one or more cachelines (e.g., 64 bytes), which may be designated read-only. In embodiments, the instruction may involve a TLB translation but not be allowed to generate a page fault. In embodiments, the instruction may be ignored if attempting to prefetch uncacheable memory types. Embodiments may include instruction serializing and memory ordering behaviors (e.g., similar to direct jumps), such as no memory ordering with respect to fence instructions (e.g., MFENCE, SFENCE, LFENCE), locked memory references, cache flush instructions (e.g., CLFLUSH, CLFLUSHOPT), other prefetch instructions (e.g., PREFETCH*), and/or any other general instruction.

Embodiments may provide for safe speculation. In embodiments, its speculative behavior may resemble that of a direct jump when it is fetched and/or when it updates internal structures. For example, as described above, there may be no memory ordering with respect to fences. For example, regarding serializing behavior (e.g., a code prefetch instruction (PREFETCHC0) following a TLB invalidate instruction (e.g., INVLPG), scoreboarding of the INVLPG instruction may not prevent a first execute-at-fetch from being performed; however, when the INVLPG instruction is retired, the pipeline may be cleared/nuked and a re-fetch performed (e.g., fetch-from-IP) for the PREFETCHC0 instruction for a second time (observing the new state). In embodiments, the prefetch does reveal anything about the program than cannot be inferred from the code stream itself (e.g., because the prefetch-address may be encoded in the binary as an immediate/displacement). In embodiments, use of code prefetch instructions may be limited when using software development techniques (e.g., optimization with dynamic profile-guided optimization (e.g., AutoFDO)), in order to prevent runtime optimized insertions of code prefetches that might reveal information about data being processed during software development.

Embodiments may include profiling support; for example, using performance monitors, last branch records (LBRs), and/or event sampling (e.g., Precise Event Based Sampling (PEBS) from Intel Corporation, Instruction Based Sampling (IBS) from AMD Corporation) to count/log events (e.g., FRONTEND RETIRED) and/or provide other information (e.g., fetch latency). In embodiments, events to be counted/logged/sampled may include precise iTLB misses, precise i-cache misses, precise iTLB misses that trigger in-use clears, precise iTLB misses that trigger in-use flushes (e.g., in case of jumpy cold misses on all iTLB ways), etc. In embodiments, other information to be provided/reported may include fetch latency, clock cycles from branch prediction unit lookup until decode, etc.

Figure 8:
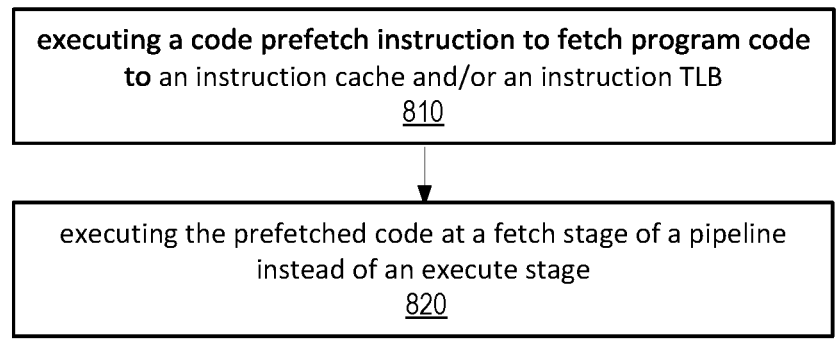
FIG. 8 illustrates a method of prefetching code according embodiments.

As shown in FIG. 8, a method embodiment may include, in 810, executing a code prefetch instruction to fetch program code to an instruction cache and/or an instruction TLB and, in 820, executing the prefetched code at a fetch stage of a pipeline instead of an execute stage. Method embodiments may also include other details, including any of those provided in descriptions of embodiments in apparatuses, cores, processors, and/or systems, etc.

In an embodiment, an apparatus may include an instruction decoder, load circuitry, and execution circuitry. The instruction decoder is to decode a code prefetch instruction. The code prefetch instruction is to specify a first instruction to be prefetched. The load circuitry to prefetch the first instruction in response to the decoded code prefetch instruction. The execution circuitry is to execute the first instruction at a fetch stage of a pipeline.

In embodiments, the first instruction is in program code stored in a memory; the code prefetch instruction is to specify an address of the first instruction; the code prefetch instruction is to specify the address of the first instruction in a displacement field; the code prefetch instruction is to specify the address of the first instruction in an immediate field; the code prefetch instruction is to specify the address as an offset; the code prefetch instruction is to specify the address as an offset from an instruction pointer; a span of the program code to be prefetched is to be specified by a parameter of the code prefetch instruction; the span is to be a multiple of a size of a cache line; the code prefetch instruction is to provide a hint to the apparatus, wherein the processor may ignore the hint; a location to which the first instruction is to be prefetched is specified by a parameter of the code prefetch instruction; prefetch of the first instruction may be conditional; the apparatus also includes performance monitoring hardware, wherein the performance monitoring hardware may be configured to provide information regarding an event related to performance of software using the code prefetching instruction; and/or the event is related to fetch latency.

In embodiments, a method may include decoding a code prefetch instruction, wherein the code prefetch instruction is to specify a first instruction to be prefetched; in response to the decoded code prefetch instruction, prefetching the first instruction; and executing the first instruction at a fetch stage of a pipeline. In embodiments, the first instruction is in program code stored in the memory; the code prefetch instruction is to specify an address of the first instruction; and/or a span of the program code to be prefetched is to be specified by a parameter of the code prefetch instruction.

In embodiments, a system may include a memory; and a processor including an instruction decoder to decode a code prefetch instruction, wherein the code prefetch instruction is to specify a first instruction to be prefetched; load circuitry to prefetch the first instruction from the memory in response to the decoded code prefetch instruction; and execution circuitry to execute the first instruction at a fetch stage of a pipeline. In embodiments, the first instruction is in program code stored in the memory.

In embodiments, an apparatus may include means for performing any function disclosed herein. In embodiments, an apparatus may comprise a data storage device that stores code that when executed by a hardware processor causes the hardware processor to perform any method disclosed herein. An apparatus may be as described in the detailed description. A method may be as described in the detailed description. In embodiments, a non-transitory machine-readable medium may store code that when executed by a machine causes the machine to perform a method comprising any method disclosed

What is claimed is:

1. An apparatus comprising:
   an instruction decoder to decode a code prefetch instruction, wherein the code prefetch instruction is to specify a relative address of a first instruction to be prefetched;
   load circuitry to prefetch the first instruction in response to the decoded code prefetch instruction; and
   execution circuitry to execute the first instruction at a fetch stage of a pipeline instead of at an execute stage of the pipeline.

2. The apparatus of claim 1, wherein the first instruction is in program code stored in a memory.

3. The apparatus of claim 1, wherein the code prefetch instruction is to specify the relative address of the first instruction in a displacement field.

4. The apparatus of claim 1, wherein the code prefetch instruction is to specify the relative address of the first instruction in an immediate field.

5. The apparatus of claim 1, wherein the code prefetch instruction is to specify the relative address as an offset.

6. The apparatus of claim 5, wherein the code prefetch instruction is to specify the relative address as an offset from an instruction pointer.

7. The apparatus of claim 2, wherein a span of the program code to be prefetched is to be specified by a parameter of the code prefetch instruction.

8. The apparatus of claim 2, wherein the span is to be a multiple of a size of a cache line.

9. The apparatus of claim 1, wherein the code prefetch instruction is to provide a hint to the apparatus, wherein the processor may ignore the hint.

10. The apparatus of claim 1, wherein a location to which the first instruction is to be prefetched is specified by a parameter of the code prefetch instruction.

11. The apparatus of claim 1, further comprising performance monitoring hardware, wherein the performance monitoring hardware may be configured to provide information regarding an event related to performance of software using the code prefetching instruction.

12. The apparatus of claim 11, wherein the event is related to fetch latency.

13. A method comprising:
    decoding a code prefetch instruction, wherein the code prefetch instruction is to specify a relative address of a first instruction to be prefetched;
    in response to the decoded code prefetch instruction, prefetching the first instruction; and
    executing the first instruction at a fetch stage of a pipeline instead of at an execute stage of the pipeline.

14. The method of claim 13, wherein the first instruction is in program code stored in the memory.

15. The method of claim 14, wherein a span of the program code to be prefetched is to be specified by a parameter of the code prefetch instruction.

16. A system comprising:
    a memory;
    a processor including:
        an instruction decoder to decode a code prefetch instruction, wherein the code prefetch instruction is to specify a relative address of a first instruction to be prefetched;
        load circuitry to prefetch the first instruction from the memory in response to the decoded code prefetch instruction; and
        execution circuitry to execute the first instruction at a fetch stage of a pipeline instead of at an execute stage of the pipeline.

17. The system of claim 16, wherein the first instruction is in program code stored in the memory.

* * * * *